Figure 1:
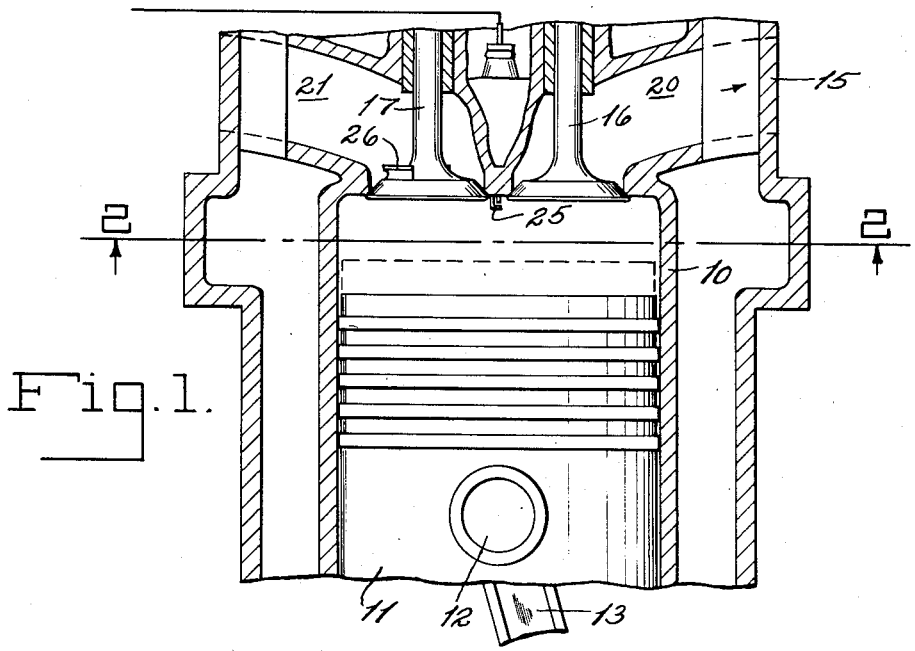

INVENTOR.
JAY B. MALIN

United States Patent Office 2,694,003
Patented Nov. 9, 1954

2,694,003

ENGINE GENERATION OF FEED GAS FOR AMMONIA SYNTHESIS

Jay B. Malin, Whittier, Calif., assignor to The Texas Company, New York, N. Y., a corporation of Delaware Application November 29, 1950, Serial No. 198,145

4 Claims. (Cl. 48—196)

The present invention relates to the generation of gas comprising a mixture of hydrogen, carbon monoxide and nitrogen by the partial combustion of a hydrocarbon with air and oxygen in the combustion space of a cyclically operating, internal combustion engine. The process of this invention is particularly useful in the generation of feed gas for the synthesis of ammonia.

In one of its more specific aspects, the present invention concerns the method of generating a mixture of hydrogen, carbon monoxide and nitrogen comprising introducing a hydrocarbon and oxygen to the combustion zone of an engine during the intake stroke or portion of the engine cycle, in the proper proportions for partial combustion to hydrogen and carbon monoxide, subjecting the mixture to substantial compression, thereafter igniting the compressed mixture and causing it to burn with ensuing expansion of combustion products, exhausting the product gas and introducing a predetermined quantity of air to the combustion zone following the exhausting of the combustion products and prior to the introduction of said hydrocarbon and oxygen. The cycle is continuously repeated to insure a continuing supply of product comprising hydrogen and carbon monoxide.

The present invention contemplates separately charging or introducing the reactants into the engine combustion zone, preferably during movement of the piston away from the cylinder head, simultaneously and into admixture with one another within the combustion zone. Alternatively, the hydrocarbon and oxygen may be premixed prior to or during introduction to the reaction zone.

The invention contemplates charging air into the combustion zone subsequent to the exhaust portion of the cycle and prior to the admission of the hydrocarbon and relative pure oxygen to effect cooling of the combustion space of the engine. The air dilutes and cools the residual gases in the combustion zone and precludes premature burning or detonation when relatively pure oxygen is admitted as one of the reactants. Often it is desirable to introduce the oxygen and hydrocarbon separately into the engine. This inevitably results in local concentrations of relatively pure oxygen.

Admission of relatively pure oxygen during the intake portion of the cycle, therefore, ordinarily results in contact of the pure, highly reactive, oxygen with highly combustible, residual product gas, which frequently is still in the final stages of partial combustion and in contact with parts of the engine, and with carbon deposits, which are at a relatively high temperature. Under these conditions, misfiring will always be imminent.

An outstanding feature of the present invention is that it overcomes the irregular and uncertain operation of combustion engine synthesis gas generators operating on a hydrocarbon and relatively pure oxygen which has been variously described as backfiring, detonation and preignition. In general, such operations are characterized by an interruption or misfire in the nature of a backfire in which the engine loses several cycles until something approaching regular operation is reached, at which time the difficulty tends to reoccur. The net result is a continuing irregularity of operation with material loss in developed mechanical energy and an inferior yield and purity of the synthesis gas.

In accordance with the present invention the residual hot combustible product gases are diluted with air, during which operation substantial cooling occurs. Therefore, when the relatively pure oxygen is subsequently admitted, the residual products of combustion are so diluted and cooled to a temperature sufficiently below the combustion range as to prevent uncontrolled burning of the mixture.

Admission of air to the engine in this manner also serves as a convenient method of supplying the required quantity of nitrogen for the synthesis of ammonia from the product gas. The air may be accurately metered to the engine by proper design of the air inlet valve and its timing and by control of the pressure at which the air is supplied to the air inlet valve.

Carbon monoxide in the product gas may be converted to hydrogen by reaction with steam in the water-gas shift reaction as is well known in the art.

Figure 2:
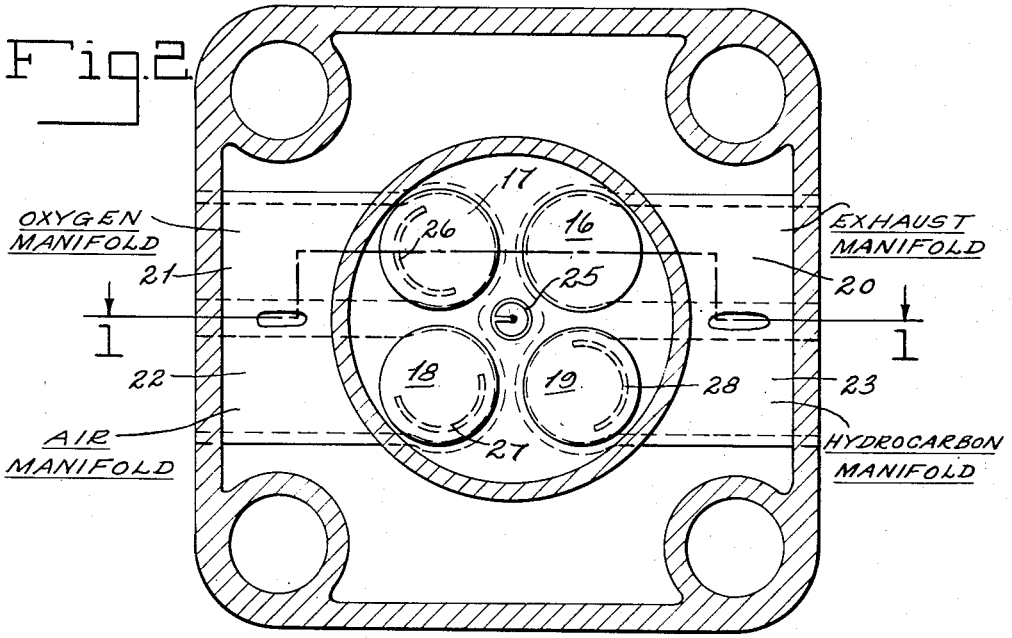
Figure 3:
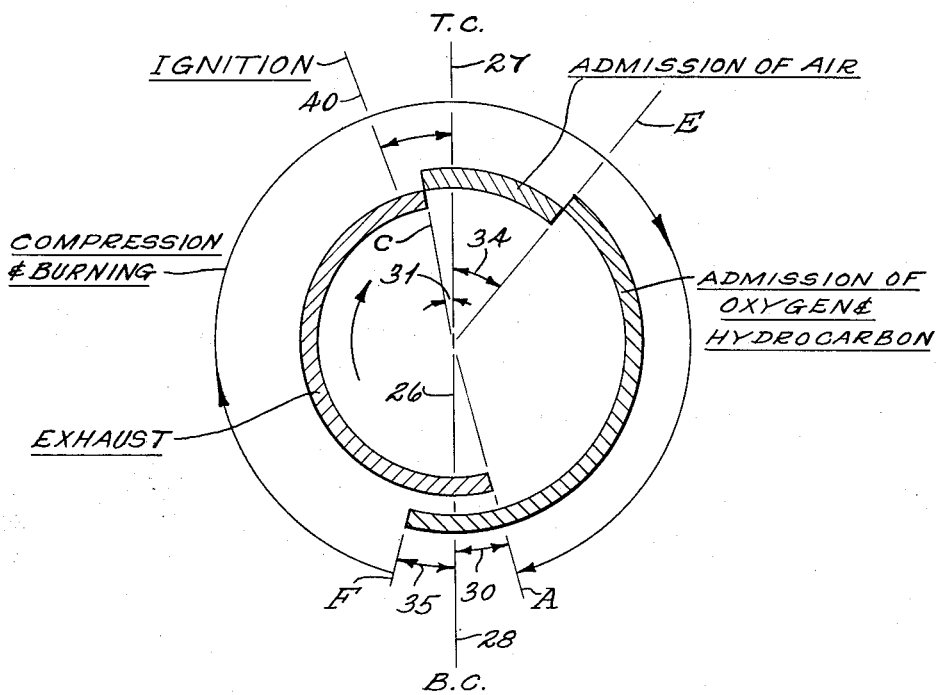

In order to more specifically disclose the present invention in greater detail, reference is had to the attached drawing, wherein Figures 1 and 2 show respectively vertical and horizontal sectional views of a combustion engine cylinder embodying the principles of the present invention, and Figure 3 is a diagrammatic representation of a typical operating cycle.

In the engine disclosed in Figures 1 and 2, which may be of a multicylinder type, an individual cylinder designated by the reference numeral 10 receives a vertically reciprocating piston 11, attached through pin 12 and connecting rod 13 to a crank shaft, not disclosed, which delivers the available mechanical energy. A cylinder head 15 is provided, wherein four separate valves 16, 17, 18, and 19 lead respectively to individual manifolds 20, 21, 22 and 23.

In the embodiment disclosed, manifold 20 receives a product gas through exhaust valve 16. Manifolds 21 and 23, respectively, supply a stream of pure oxygen and a stream of gaseous hydrocarbon. Manifold 22 supplies air under pressure through valve 18.

Ignition is effected by means of a spark plug 25 connected with electrical igniting means, not shown, and timed as will hereinafter be disclosed in greater detail.

Valves 17, 18 and 19 are preferably shrouded as indicated at 26, 27, and 28 with annularly disposed projections arranged to insure high turbulence and therefore complete mixing of the admitted reactants by effecting admission or injection in about the same rotational direction with reference to the axis of the cylinder. It will be understood that the exact arrangement or construction of the mixing shrouds does not, per se, form an essential part of the present invention, and accordingly, this construction is not shown in detail. Actually, it has been found that shrouds extending annularly through 90–180° of the valve are effective when faced in generally the same rotational direction. However, this construction may obviously be varied widely to secure adequate mixing and alternatively, provision of directional intake ports and/or turbulence producing cylinder head arrangements may be substituted for this purpose.

In accordance with one embodiment of the present invention, provision, not shown, is made for timing the operating of the valves and ignition means in accordance with the diagram set forth in Figure 3.

With reference to the specific example illustrated in Figure 3, progressing in a clockwise direction from the point A there is symbolized the complete cycle of operation in the case of a typical four-stroke cycle reciprocating engine. The vertical line 26 symbolizes the angular position of the combustion engine cylinder axis. Therefore, point 27 represents top dead center and point 28 bottom dead center. Accordingly, the angular movement on the right hand side of the line 26 covers the approximate intake and combustion or burning portions of the cycle, whereas the opposite side of the diagram relates, in general, to the compression and exhaust portions of the cycle.

Beginning with the exhaust portion of the cycle at the angular position A the exhaust valve opens, preferably though not necessarily, somewhat in advance of bottom dead center, and remains open throughout approximately the entire upstroke of the piston, as represented by the shaded area entitled "Exhaust," during which the product gas produced in a previous cycle of operation flows through outlet valve 16 into the exhaust manifold 20. In the cycle shown, the exhaust valve opens at 20° before bottom center, and closes at 10° before top center as indicated by the angular distance 30 and 31 respectively.

At the angular position C, the exhaust valve closes and the air inlet valve 18 opens so that air under pressure enters from manifold 22. Admission of the air in the specific example selected, takes place beginning at an angular distance 31 of 10° before top center and continuing throughout the shaded portion of the cycle entitled "Admission of Air" to the angular position E at an angular distance 34 of 40° after top center. The air valve closes and the hydrocarbon and oxygen valve simultaneously open at E so that the hydrocarbon and oxygen under pressure enter from manifolds 21 and 23. Admission of reactants, in the specific example selected, takes place beginning at E, 40° after top center and continuing throughout the shaded portion of the cycle entitled "Admission of Oxygen and Hydrocarbon" to the angular position F, preferably about or slightly after bottom center, and in this specific example 15° after bottom center as indicated by arc 35.

Following this point, with the valves closed, the engine goes through almost a complete revolution in which the mixed gases are compressed, subjected to ignition at point 40, and thereafter burned as indicated in the line designated as "Compression and Burning" which continues to angular position A, at which the four-stroke cycle of operation is repeated.

It is to be understood that there is a wide permissible variation of valve and ignition timing from those disclosed in the above specific example. For example, opening of the exhaust valve usually takes place anywhere from 40° before to 40° after bottom center, but preferably, at least 10° in advance of bottom center. While the exhaust valve normally closes at about top dead center, it may be adjusted in accordance with engine characteristics to close from 20° in advance to 20° beyond top center.

In order to effect efficient charging of reactants, the air advantageously opens about or before top center, as for example, as much as 20° in advance, depending upon the point at which the exhaust valve closes. The oxygen and hydrocarbon gas inlet valves may open before the air valve closes and may close before, or preferably, somewhat after bottom center, as for example, 10° or even as much as 20° thereafter. The ignition point 40 depends on known principles of engine design and operation which, per se, form no part of the present invention. Therefore, spark timing is preferably adjusted for development of maximum mechanical energy with due regard to engine speed and other engine characteristics.

As above indicated, the invention especially contemplates feeding the engine with a normally gaseous hydrocarbon such as methane, and the $C_2$–$C_4$ hydrocarbons, such, for example, as are found in natural gas. Broadly, however, the feed may include gaseous or liquid hydrocarbons. Normally liquid hydrocarbons may be fed in a gasiform condition under a substantial preheat or injected into the cylinder.

Preheating of either or both the reactants, and air to temperatures of 300–600° F. and higher is specifically contemplated as a means of improving thermal efficiency. It is to be understood that in spite of the preheating, the temperature of the air is substantially lower than that of the residual combustion mixture so that an initial cooling or quenching occurs to such an extent that uncontrolled ignition is inhibited. Therefore, the present process enables a substantial and desirable preheating of the reactants without the misfiring or preignition tendency which otherwise would accompany the introduction of relatively high temperature, substantially pure oxygen into the combustion zone.

The feed stream of oxygen is, as previously emphasized, advantageously enriched or rectified gas composed predominantly of molecular or free oxygen. Preferably, it contains over 80% and desirably over 90–95% oxygen.

The ratio of oxygen to hydrocarbon for the production of the desired synthesis gas forms, per se, no part of the present invention, but is determined in general by the stoichiometric proportions indicated for partial combution to form maximum hydrogen and carbon monoxide. However, as is known in the production of hydrogen and carbon monoxide in an internal combustion engine, from the standpoint of yield, a slight excess of oxygen is usually advantageous. The preferred range of feed proportions to achieve these objectives is best expressed in terms of the atomic O/C ratio of the total reactants supplied. Optimum yield for a typical engine ordinarily occurs with an O/C feed ratio of about 1.0:1 to about 2.5:1. In each instance, however, the most appropriate ratio for maximum yield depends upon the specific characteristics of the engine and is best determined by actual trial.

The injection of the air results in metered inclusion of a predetermined amount of nitrogen in the reactant mixture, which is subjected to ignition. In general, the amount of air which is introduced to the engine is from 4 to 5 times the volume of substantially pure oxygen supplied to the engine.

In the illustrated description above, the preferred valve shrouding is aligned to produce a unidirectional swirl. As there intimated, however, the highly desirable intimate admixing of the reactants may be realized by arranging the valve shrouds in rotationally opposed directions so as to induce opposing swirling of the introduced reactants. Actually, it appears at the present time that opposed swirling provides somewhat more thorough mixing. Accordingly, the invention contemplates any combination of swirling actions effective to realize the desired mixing and combustion.

Obviously, many modifications and variations of the invention as hereinbefore set forth may be made without departing from the spirit and scope thereof, and therefore only such limitations should be imposed as are indicated in the appended claims.

I claim:

1. In the combustion engine generation of hydrogen and carbon monoxide by the reaction of a hydrocarbon with an oxygen-containing gas wherein said reactants are charged into the combustion space of a four-stroke cycle internal combustion engine in approximate relative proportions for the formation of hydrogen and carbon monoxide, mixed and compressed therein, subjected to internal combustion with the generation of mechanical energy, and products of reaction thereafter exhausted from the combustion space, the improvement which comprises charging a limited amount of air to the combustion space immediately following and only immediately following the period in which products of reaction are exhausted therefrom and prior to the introduction of the hydrocarbon thereto, thereafter introducing said hydrocarbon and a limited amount of relatively pure oxygen to the combustion space into admixture with said air, said air thereby effecting cooling of the combustion space prior to the introduction of relatively pure oxygen, compressing the mixture of reactants, igniting said mixture to produce products of reaction comprising carbon monoxide and hydrogen containing a predetermined amount of nitrogen, and exhausting said products from the combustion space.

2. The method according to claim 1, wherein said hydrocarbon is a normally gaseous hydrocarbon.

3. In the combustion engine generation of hydrogen and carbon monoxide by the reaction of a gasiform hydrocarbon with an oxygen-containing gas wherein said reactants are charged to the combustion space of a four-stroke cycle internal combustion engine in approximate relative proportions for the formation of hydrogen and carbon monoxide, compressed therein, subjected to internal combustion with the generation of mechanical energy, and products of reaction thereafter exhausted from the combustion space, the improvement which comprises charging a limited amount of air to the combustion space immediately following and only immediately following the period in which products of reaction are exhausted therefrom and prior to the introduction of the hydrocarbon, thereafter introducing said hydrocarbon and a limited amount of relatively pure oxygen thereto into admixture with said air, said air effecting cooling of the combustion space prior to the introduction of relatively pure oxygen, compressing the mixture of reactants, igniting said mixture to produce products of reaction comprising carbon monoxide and hydrogen containing a predetermined amount of nitrogen, and exhausting said products from the combustion space.

4. In the combustion engine generation of hydrogen and carbon monoxide by the reaction of a gasiform hydrocarbon with an oxygen-containing gas wherein said reactants are separately charged into the combustion space of a four-stroke cycle internal combustion engine in approximate relative proportions for the formation of hydrogen and carbon monoxide, mixed and compressed therein, subjected to internal combustion with the generation of mechanical energy, and products of reaction thereafter exhausted from the combustion space, the improvement which comprises charging a limited amount of air to the combustion space following and only immediately following the period in which said products are exhausted therefrom such that residual products of reaction remaining in said combustion space are diluted by the admitted air, thereafter admitting said hydrocarbon and a limited amount of oxygen-containing gas comprising at least 80 per cent oxygen to the combustion space, into admixture with said air and residual products, compressing the mixture of reactants, igniting said mixture to produce products of reaction comprising carbon monoxide and hydrogen containing a predetermined amount of nitrogen, and exhausting said product from the combustion space.

References Cited in the file of this patent

UNITED STATES PATENTS

| Number | Name | Date |
|---|---|---|
| 1,107,581 | Brownlee et al. | Aug. 18, 1914 |
| 1,107,582 | Brownlee et al. | Aug. 18, 1914 |
| 1,211,509 | Wells | Jan. 9, 1917 |
| 1,741,730 | Newton | Dec. 31, 1929 |
| 2,484,249 | Ruble | Oct. 11, 1949 |
| 2,543,791 | Malin | Mar. 6, 1951 |